Dec. 25, 1928.  1,696,887
C. F. NEWPHER
MACHINE FOR MAKING HOT PRESSED NUTS
Filed Aug. 26, 1925   11 Sheets-Sheet 2

Dec. 25, 1928.

C. F. NEWPHER 1,696,887

MACHINE FOR MAKING HOT PRESSED NUTS

Filed Aug. 26, 1926  11 Sheets-Sheet 5

Fig. 7

Inventor
Chas. F. Newpher,
By Hull, Brock West.
Attorneys

Dec. 25, 1928.

C. F. NEWPHER 1,696,887

MACHINE FOR MAKING HOT PRESSED NUTS

Filed Aug. 26, 1926    11 Sheets-Sheet 8

Inventor
Chas. F. Newpher,
By Hull, Brock & West,
Attorneys

Dec. 25, 1928.  1,696,887
C. F. NEWPHER
MACHINE FOR MAKING HOT PRESSED NUTS
Filed Aug. 26, 1926    11 Sheets-Sheet 9

Dec. 25, 1928.

C. F. NEWPHER 1,696,887

MACHINE FOR MAKING HOT PRESSED NUTS

Filed Aug. 26, 1926 — 11 Sheets-Sheet 10

Inventor
Chas. F. Newpher,
Hull, Brock & West
Attorneys

Dec. 25, 1928.

C. F. NEWPHER 1,696,887

MACHINE FOR MAKING HOT PRESSED NUTS

Filed Aug. 26, 1926    11 Sheets-Sheet 11

Inventor
Chas. F. Newpher,
By Hull, Brock & West.
Attorneys

Patented Dec. 25, 1928.

1,696,887

UNITED STATES PATENT OFFICE.

CHARLES F. NEWPHER, OF SHAKER HEIGHTS, OHIO, ASSIGNOR TO THE BOURNE-FULLER COMPANY, OF CLEVELAND, OHIO, A CORPORATION OF OHIO.

MACHINE FOR MAKING HOT-PRESSED NUTS.

Application filed August 26, 1926. Serial No. 131,567.

This invention relates to machines or processes for making hot-pressed nuts. In the operation of machines or presses of this character, a red hot bar is pushed against a stock gage and hexagonal nut blanks are punched therefrom and shaped in a die, each punching operation resulting in shearing from the advancing end of the bar a "slug" of the general contour of a pair of wedges having their apexes presented toward each other. These slugs are ordinarily separated from the nuts by means of a riddle or screen; but, owing to the shape and length of the slugs and the presence of sharp corners and fins thereon, this mode of separation is unsatisfactory, as some of the nuts will pass through the meshes, together with the slugs, while some of the slugs will remain unscreened, remaining with the nuts.

It is the general purpose and object of this invention to provide an attachment for machines of the character referred to whereby the slugs and nuts will be effectively separated and without recourse to the unsatisfactory screen or riddles which have been used heretofore. Further and more limited objects of the invention will appear hereinafter and will be realized by means of the construction shown in the drawings hereof, wherein Fig. 13 a detail in perspective of the punch holder and Fig. 14 a detail in perspective of the punch employed with this third form of my invention.

Figure 15:
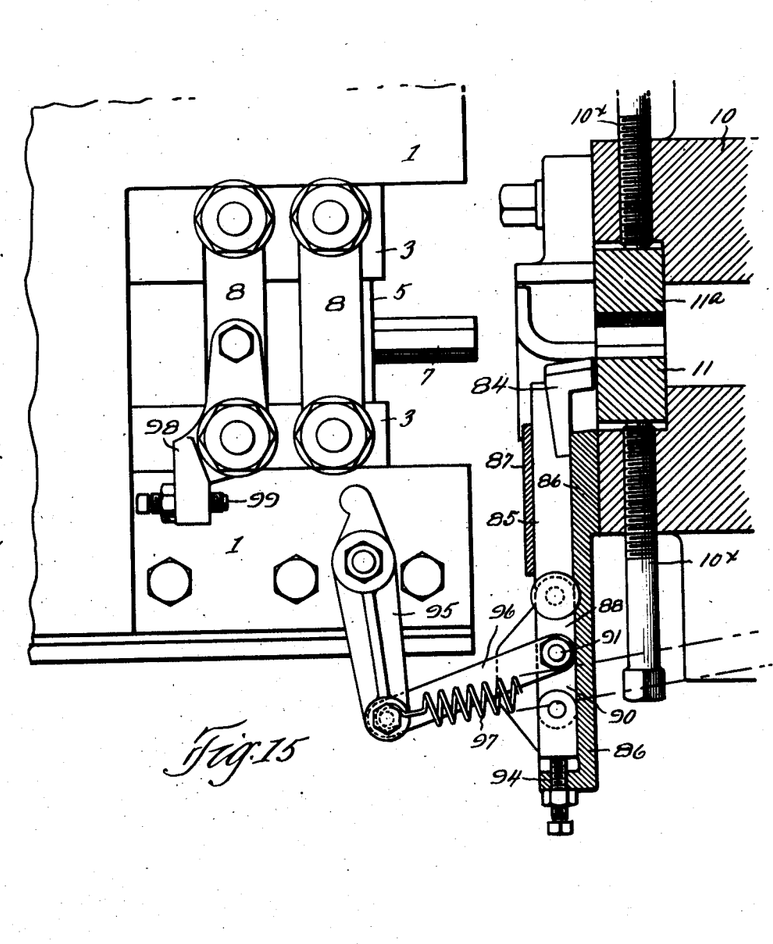
Figs. 15 and 16 are views, corresponding to Figs. 1 and 3 respectively of a further modification of my invention.
Figure 16:
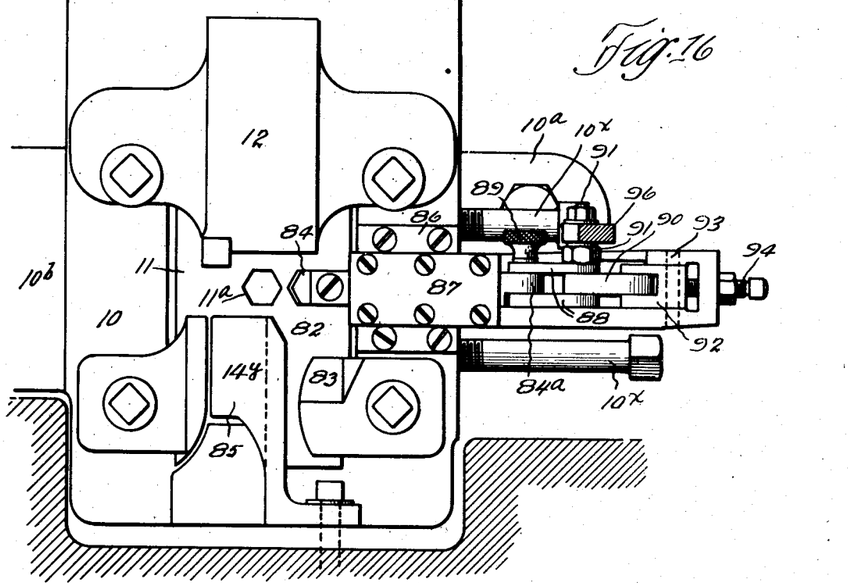
Figure 17:
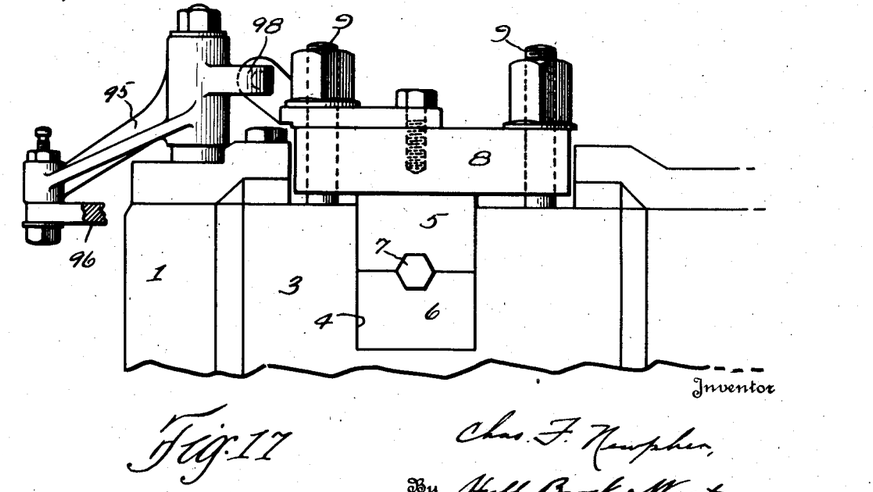
Fig. 17 a detail in sectional rear elevation of the mechanism shown in Figs. 15 and 16.
Figure 18:
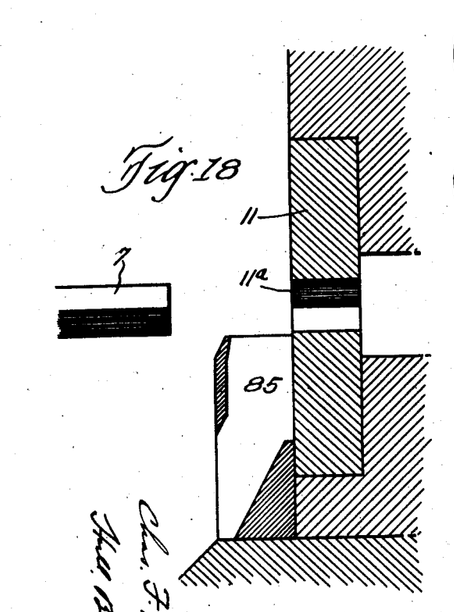
Fig. 18 a view similar to Fig. 2 of this third modification of my invention.

Describing the parts by reference characters and in connection with Figs. 1–5 inclusive, A denotes generally the bed or frame of the press to which my attachment is applied. The press is of a type that is well known to the trade, and no detailed illustration of the same is necessary, except as to the particular parts thereof with which my invention cooperates directly. An example of such type of press is one known to the trade as the National standard center-feed hot-nut press. Secured to this bed or frame is a pair of guides 1, the guides being secured to the bed or frame by bolts 2. 3 denotes a cross head mounted in said guides. The cross head is provided with a slot 4 in which is mounted upper and lower punch blocks 5 and 6, the said blocks each having a partial recess for the reception of a shearing punch 7, the punch being shown as hexagonal in cross section, corresponding to the shape of the nut blanks which are to be punched thereby from the stock (see Figs. 1, 15 and 17). The upper punch block is clamped against the lower punch block by a pair of cross bars 8 which are fastened to the cross head by means of bolts 9. For convenience of description the end of the machine or press toward which the bar of stock is moved, for the purpose of punching nut blanks therefrom, will be referred to herein as the "front" and the opposite part of the machine or press as the "rear".

Figures 1, 2:
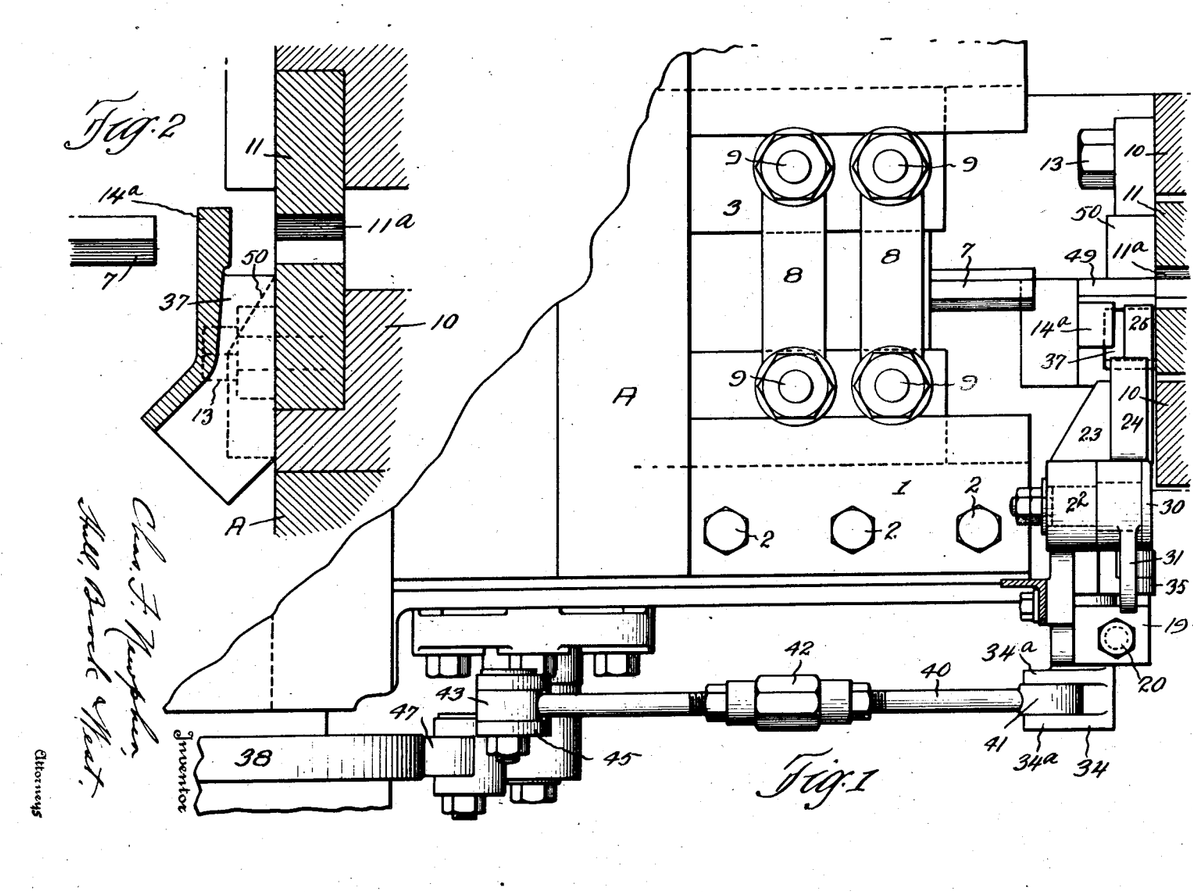
Fig. 1 represents a detail in sectional plan view of my separating mechanism, showing the same applied to a machine of the type known to the trade as a center-feed hot-nut press.
Fig. 2 a detail in section corresponding substantially to the line 2—2 of Fig. 1.
Figures 3, 6:
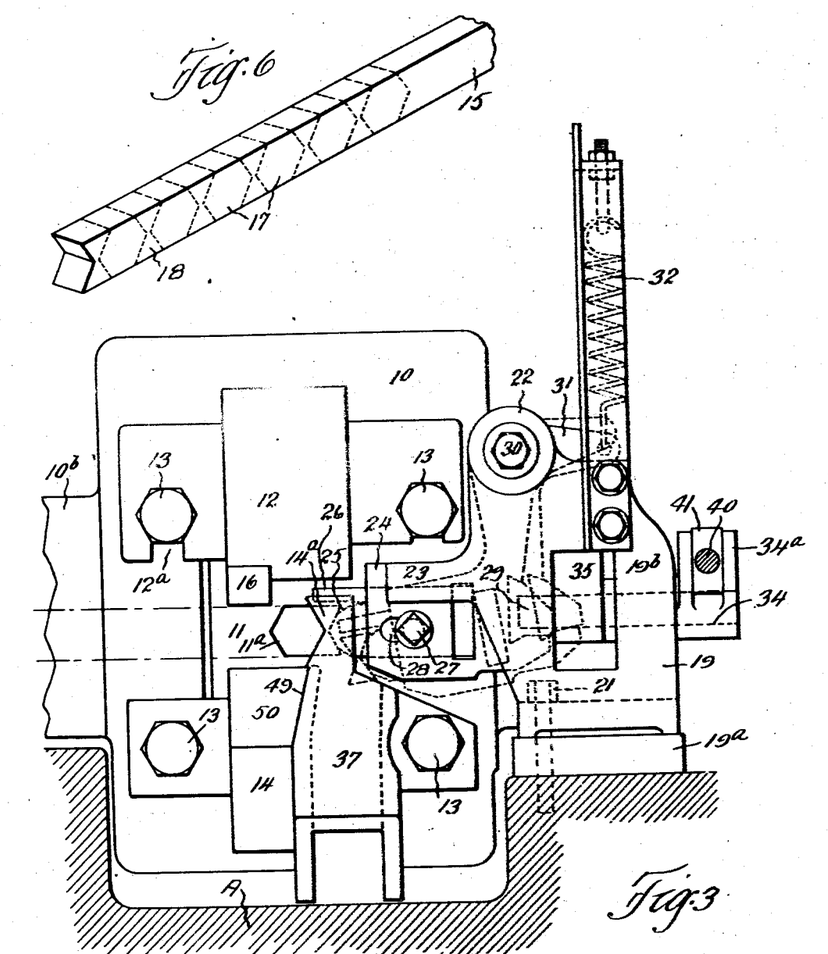
Fig. 3 a detail in sectional front elevation of the mechanism shown in Fig. 1.
Fig. 6 a detail in perspective of the stock from which the nuts are pressed, indicating the manner in which the nut blanks are progressively punched from the advancing end of the stock and showing the shapes of the slugs formed between the nut blanks.
Figure 4:
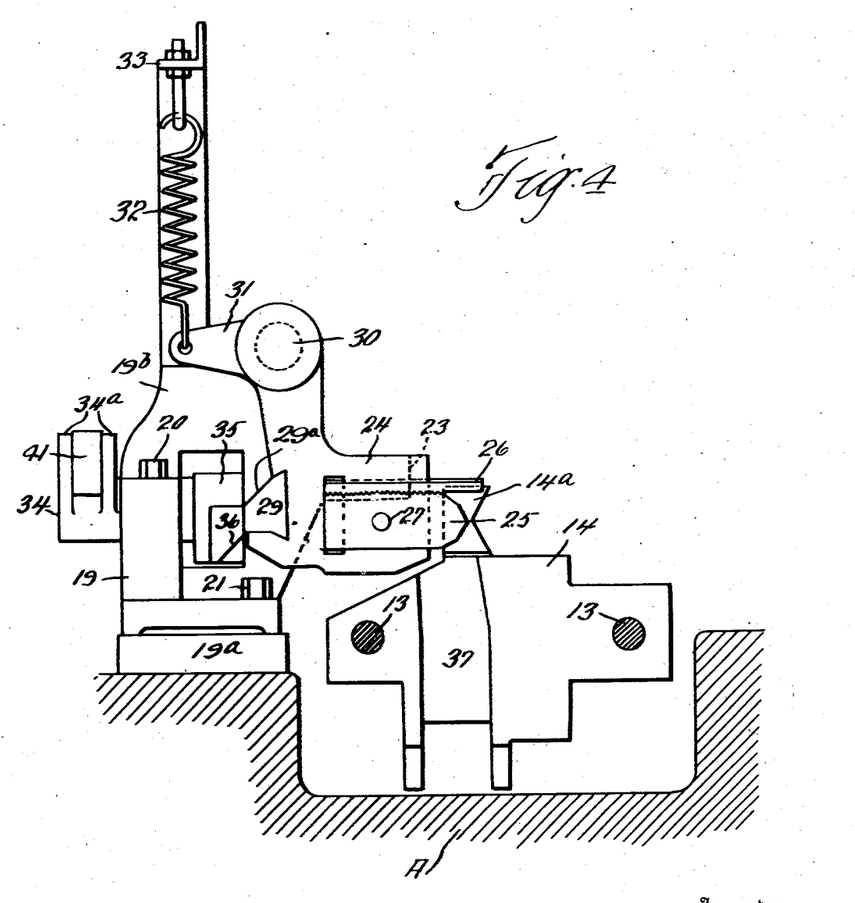
Fig. 4 a detail in sectional elevation of the mechanism shown at the right of Fig. 3, looking in the opposite direction.
Figure 5:
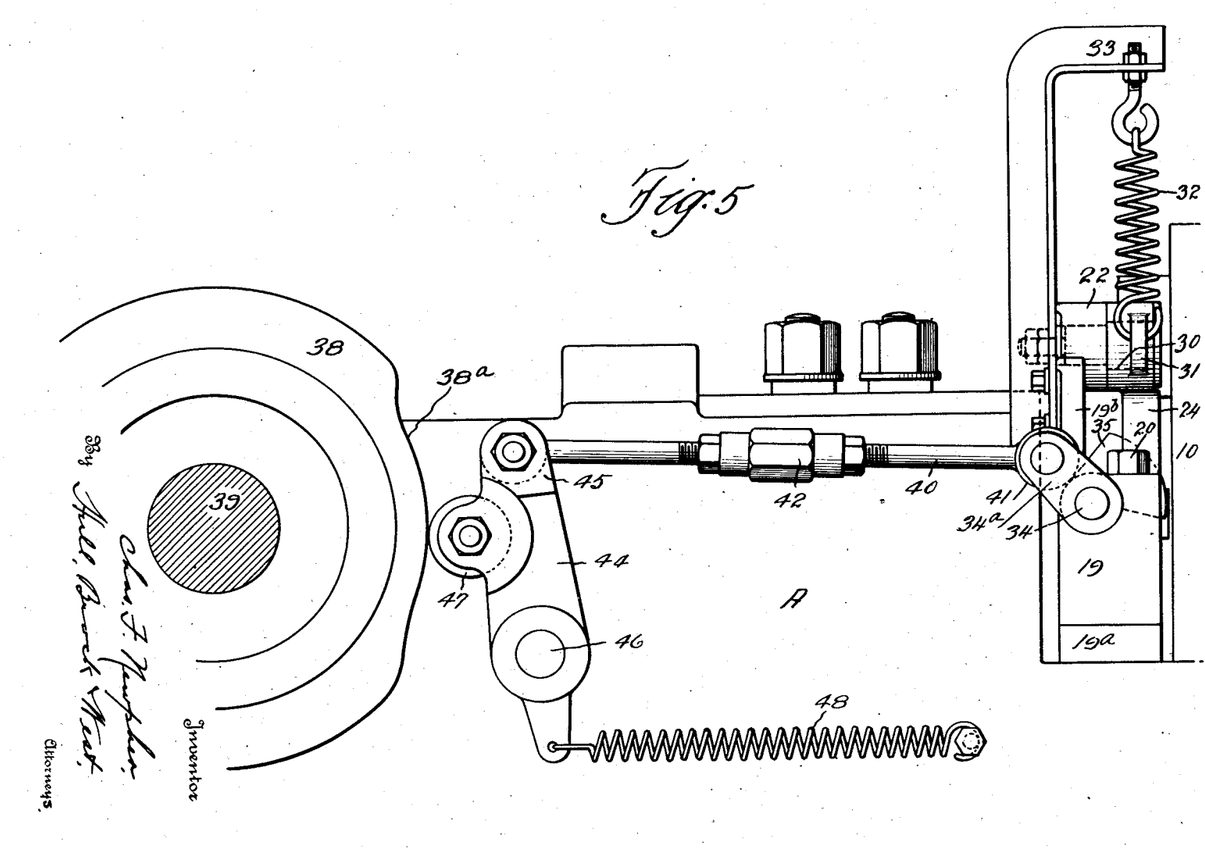
Fig. 5 a detail in side elevation of the mechanism shown in Fig. 1.
Figure 10:
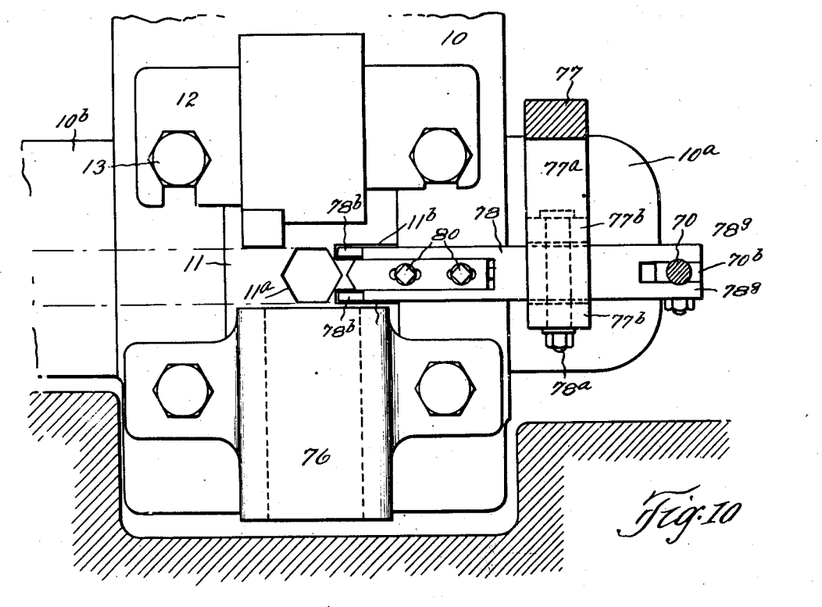
Fig. 10 a view in section corresponding to the line 10—10 on Fig. 11.

Secured to the frame of the machine is a die box, indicated at 10, and having a shearing die 11 adjustably mounted therein, this die being provided with a hexagonal die opening 11ª for the reception and shaping of the nut blank which is struck from the stock by the punch 7 (see Figs. 1, 3 and 10). The die is held within the die box by top and bottom face plates, the top plate, indicated at 12, being fastened to the die box by means of screw bolts 13 extending through slots 12ª.

A special lower face plate 14 is secured to the die box 10 by bolts 13 and, together with the face plate 12, holds the die in place.

In presses of the type to which my invention is applied, the red hot bar of stock 15 is slid along an appropriate rest, beneath a projection 16, until its front end engages a stock gage. The punch 7 is then operated to cut off a nut blank 17 from such bar and push the same into the die opening 11$^a$, which insures the proper external shape for the nut blank. The bar is withdrawn, the nut blank is pushed rearwardly out of the die opening, and the nut blank and slug 18, which are removed from the stock by the same stroke of the punch, are usually separated by the screening or riddling operation referred to hereinbefore.

19 denotes a bracket which is secured to the bed or frame A, the bracket being shown as resting upon a spacer 19$^a$ and being secured to said bed or frame by bolts 20, 21. This bracket pivotally supports a "kicker" for the slugs, which kicker also carries the stock gage. Referring to Fig. 3, it will be seen that the bracket comprises a side plate 19$^b$ which extends upwardly from the spacer 19$^a$ and has at its inner upper end a bearing 22, from which the plate extends downwardly and laterally, providing a lateral extension 23. The kicker for removing the slugs or scrap is behind the side plate 19$^b$ and comprises a plate having a laterally projecting portion 24 in which there is mounted a stock gage 25, said gage being secured in a groove in such projection by a key having an extension 26 which is normally spaced from and overhangs the slug 18 at the end of the bar 15. The stock gage is provided with an angular end adapted to fit into the notch formed in the end of the bar by the act of punching the last preceding nut blank therefrom. The stock gage is adjustably connected to the lateral extension of the kicker plate by means of a bolt 27 and a slot 28. At the end opposite the projection 24, the kicker plate is provided with a hardened block 29 which is fitted into a dove-tailed seat therein, the said block having an end adapted to engage a cam (to be described hereinafter).

The upper end of the kicker is pivoted to the bearing 22 of the bracket by means of a pivot bolt 30 mounted in said bearing and extending through an eye or sleeve in the upper end of the kicker. The kicker is also provided with an arm 31 projecting from the pivotally supported portion thereof, the said arm being connected to a coil spring 32, the upper end of which is supported by an arm 33 bolted to and forming part of the bracket 19.

Mounted in the bracket is a rock shaft 34, said rock-shaft carrying a cam 35 having a beveled face 36 presented toward the block 29 whereby, as the shaft is rocked in the appropriate direction, the said block will move along said beveled face, under the influence of the spring 32, and the kicker will be moved about its pivot 30, thereby freeing the slug 18 and permitting it to drop. The pivot 30 is so arranged and the kicker is so shaped with reference to such pivotal support that no thrust toward the punch 7 will be exerted by the kicker as it swings about its pivot. This will ordinarily enable the slug to be moved downwardly by and dropped freely from the stock gage into a chute 37, which is provided on one face of the bottom face plate 14. However, should the slug adhere to the punch or to any other part, as, for instance, the overhanging part 14$^a$ of the plate 14, which acts as a stripper to prevent the slug from being pulled outwardly by adherence to the punch, the projection 26 on the kicker will engage the slug and cause it to loosen and drop into the chute.

The shaft 34 is rocked by a cam 38 on a shaft 39, which is preferably the shaft which operates the punch. A convenient manner of so rocking the shaft 34 is shown in the drawings, and consists of arms 34$^a$, rigid with the shaft, between which there is pivotally supported an eye 41 on one end of a link 40 which link is made in two sections and is adjustable for length by means of a turn buckle 42. The opposite end of the link 40 is provided with an eye 43 which is pivotally mounted between forks 45 on the upper end of a lever 44, which is pivoted near its lower end, as indicated at 46. The lever 44 carries a roller 47 which is held in engagement with the operating face of the cam 38 by means of a spring 48 connected to the lower end of the said lever. The operating face of the cam is provided with a recess 38$^a$ into which the roller can drop, under the influence of the spring 48, which results in rocking the shaft 34 in a direction to bring the inclined face 36 of the cam 35 in register with the end of the hardened block 29 on the kicker. The spring 48 will rock the shaft 34 to bring the inclined face of the cam 35 into engagement with the end of the block 29, allowing the spring 32 to rock the kicker to the position shown in the dot-and-dash lines in Fig. 3, in which position the stock gage will ordinarily have freed the plug 18 from engagement with the punch. However, should the slug adhere to the punch or to any other part of the press, such as the part 14$^a$, by reason of fins or irregularities on the slug, and thus fail to move downwardly with the stock gage 25, the projection 26 will strike the top of the slug and disengage it. The slug, in either event, will be discharged into the chute 37. As soon as the elevated surface of the cam 38 passes beneath the roller 47, the shaft 34 will be rocked thereby in the reverse direction, moving the inclined face 36 of the cam 35 along the upper inclined face 29$^a$ of the block 29 and resetting the kicker and stock gage to the position shown in full lines in Fig. 3.

As the nut blanks are ejected from the die opening 11ª, they first strike an inclined surface 49 and then an outwardly inclined surface 50 formed on the lower face plate 14, these surfaces being so arranged as to deflect the nut blanks away from the slugs at the bottom of the chute 37.

Figure 7:
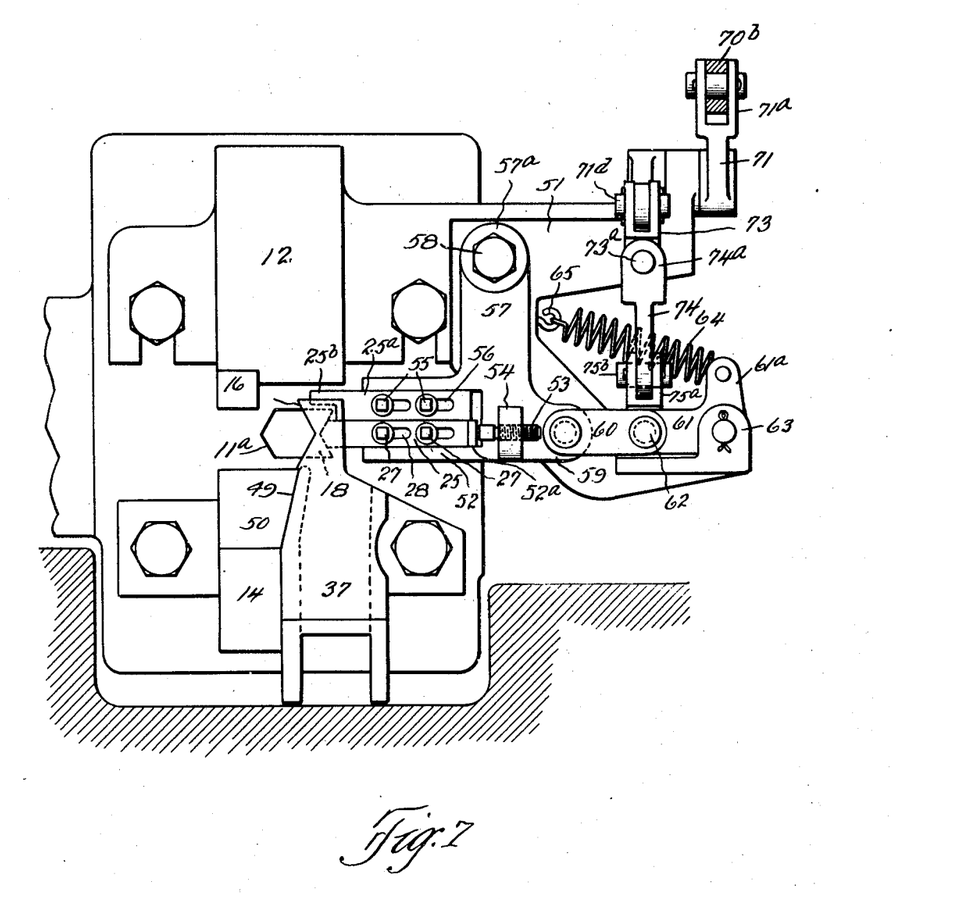
Figs. 7 and 8 are views, similar to Figs. 3 and 5, respectively, showing a modification of my invention.
Figure 8:
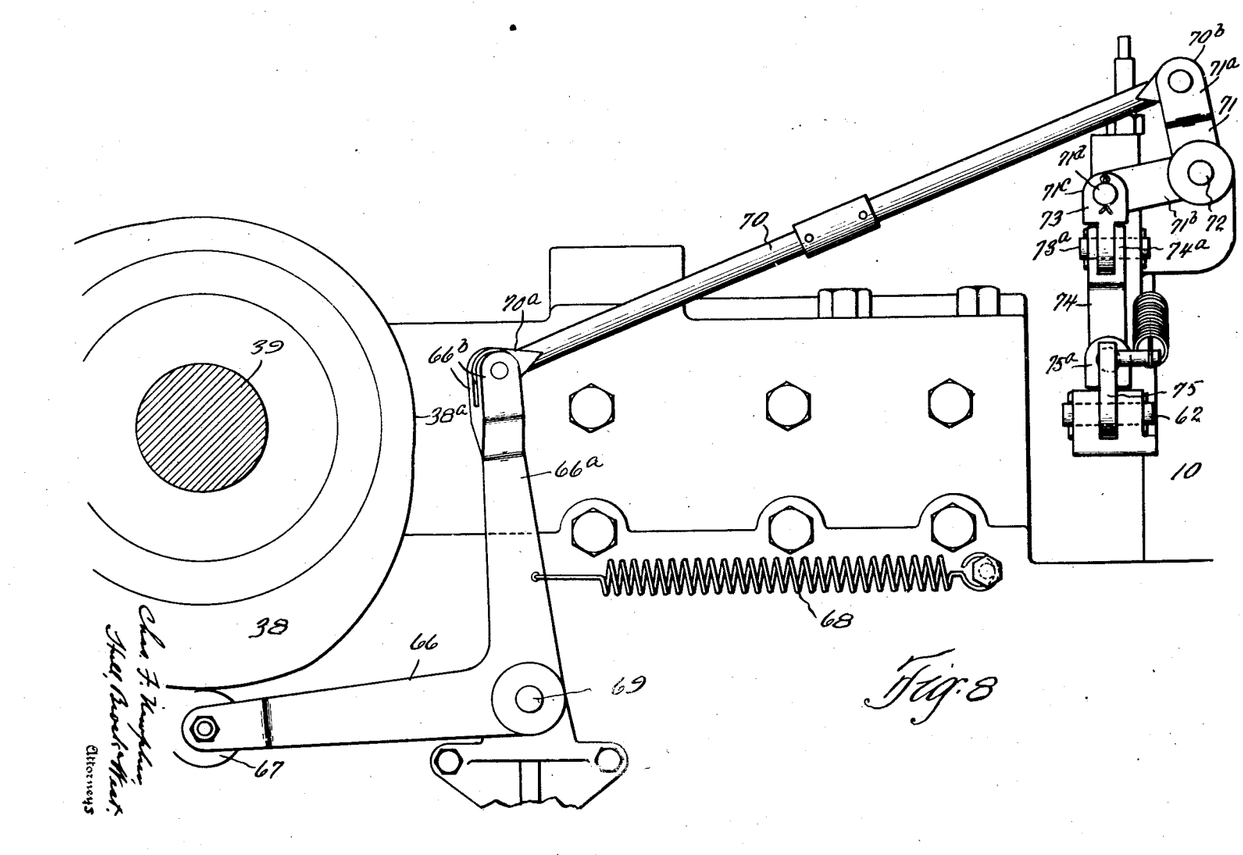

In Figs. 7 and 8 there is shown a modification of my invention wherein the bracket 51 constitutes an extension of the upper face plate 12, the face plate being in other respects identical with the face plate shown in the preceding views. The lower face plate is identical in construction with that shown in the preceding views and is designated by like reference characters.

The kicker in this case comprises a laterally extending body 52 having a wide slot 52ª therein, in the lower portion of which is mounted the stock gage 25, the gage being secured in place by means of bolts 27 and slots 28. In this case, the thrust of the bar against the stock gage is taken by means of a screw 53 which is adjustably mounted in a lug 54 on the kicker. The key 25ª which has the extension 25ᵇ for engaging the slug 18 is mounted in the slot 52ª above the stock gage, being adjustably secured in said slot by bolts 55 and slots 56. From the body 52 an arm 57 extends upwardly, the arm having a bearing 57ª at its upper end by which it is pivotally mounted upon a stud 58 carried by the bracket. The kicker is provided with an extension 59, opposite the body portion 52, to which extension there is pivotally connected one link 60 of a toggle, the other link 61 being pivoted to the link 60, at 62, and having its opposite end pivoted between lugs 63 on the bracket. The link 61 is provided with an arm 61ª extending upwardly therefrom and at substantially right angles to the body of the link. A coil spring 64 is connected to the upper end of the arm 61ª and to an eye 65 carried by the bracket. This spring tends to hold the two links or arms of the toggle in alignment.

The kicker is operated by the cam 38, the operating connections including a bell crank lever, one arm 66 whereof is provided with a roller 67 engaging the surface of the cam. The other arm 66ª of the lever has a spring 68 connected thereto, which holds the roller in engagement with the cam. The lever is pivotally supported at 69. The upper end of the arm 66ª is forked, as shown at 66ᵇ, and the forks have pivoted therebetween an eye 70ª on one end of a link 70, the opposite end of the link being provided with an eye 70ᵇ which is pivoted between forks 71ª at the upper end of one of the arms 71 of a bell crank lever which is pivotally supported from the bracket at 72. The other arm 71ᵇ of the last mentioned lever is provided with an eye 71ᶜ which is pivoted to and between forks on a short link 73, the lower end of which is pivoted between forks 74ª on a short link 74; the lower end of the link 74 is connected to the pivot 62 of the toggle 60, 61. The pivots 71ᵈ and 73ª are at right angles to each other; the pivot 75ᵇ is at right angles to the pivot 73ª and the pivot 62 is at right angles to the pivot 75ᵇ. This provides a flexible connection between the arm 71ᵇ and the toggle.

With the parts constructed and arranged as described, when the roller 67 reaches the low or recessed part 38ª of the cam, the spring 68, being stronger than the spring 64, rocks the bell crank lever 66, 66ª, moving the arm 71 to the right and pulling up on the toggle pivot 62, against the action of the spring 64. The bending of the toggle in the middle rocks the kicker about its pivot 58, thereby to remove the slugs 18 in the same manner as described in connection with the preceding form of my invention. When the roller 67 rides upon the high part of the cam 39, it rocks the bell crank lever 66, 66ª in the reverse direction, against the action of the spring 68. This thrusts down upon the middle of the toggle 60, 61, and the spring 64 insures the toggle links being held in alignment until the roller 67 again reaches a low spot on the cam 38. The straightening of the toggle links 60, 61 resets the kicker to the position shown in Fig. 6.

In Figs. 9–14 inclusive there is shown another modification of my invention in which the kicker, carrying the stock gage, is so pivoted as to be swung about a vertical axis. In the views referred to, the die box 10 and die 11 are substantially of the same construction as shown in the preceding views, the die having a pair of horizontally extending recesses 11ᵇ, which are adapted to receive forwardly extending projections on the kicker, to be described hereinafter. The face plate 12 is the same in construction as is the case with preceding modifications, and the die box is provided with lugs or ears 10ª, 10ᵇ, by which it is secured to the bed or frame, the lug 10ª not appearing in the preceding views. The lower face plate 14ˣ is of the same general construction as the face plate 14 in the preceding views, except that the chute 76 is somewhat different in shape and arrangement from the chute 37 shown in the preceding views.

Secured to the bed or plate is the bracket 77, the said bracket having a depending arm 77ª terminating in a fork comprising a pair of lugs 77ᵇ which receive therebetween an eye or sleeve on a kicker bar 78, the said bar being pivoted intermediate its ends to and between the said lugs by a pin 78ª. The kicker bar projects across one side of the die 11 and is provided with projections 78ª having curved faces adapted to be received within the correspondingly-shaped recesses 11ᵇ in the die. The projections extend beyond the body of the kicker bar and are provided with faces 78^b which are substantially flush with the face of the die. The projections 78^a are adapted to engage a slug 18 as the kicker bar is rocked (by means to be described hereinafter). The bar is provided at its slug-engaging end with a longitudinal slot 78^c which is adapted to receive the body portion 79 of the stock gage, the said gage having its stock-engaging end 79^a partly offset from the body 79, as shown at 79^b, the offset part 79^b being adapted to engage thrust shoulders 78^b on the kicker bar. The stock gage is adjustably secured to the kicker bar by means of bolts 80 extending through slots 79^c in the gage and through openings 78^e in the kicker bar. A screw 81, which is threaded through an extension of the bracket 77 and through a longitudinal aperture 78^f in the kicker bar, is adapted to engage the end of the stock gage, thereby to relieve the kicker bar of the thrust of the same.

Figures 9, 12:
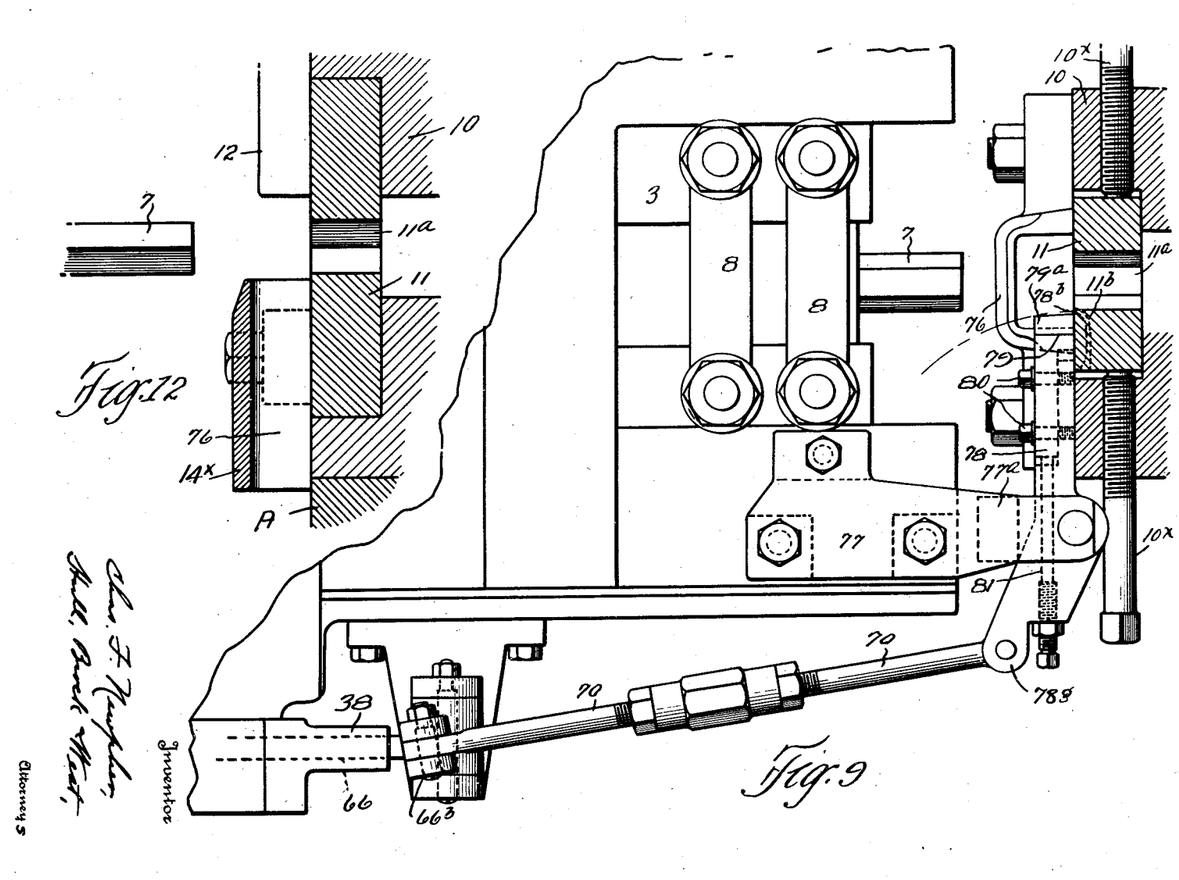
Fig. 9 is a view, similar to Fig. 1, of a further modification of my invention.
Fig. 12 a view, similar to Fig. 2, of a second modification of my invention.
Figure 11:
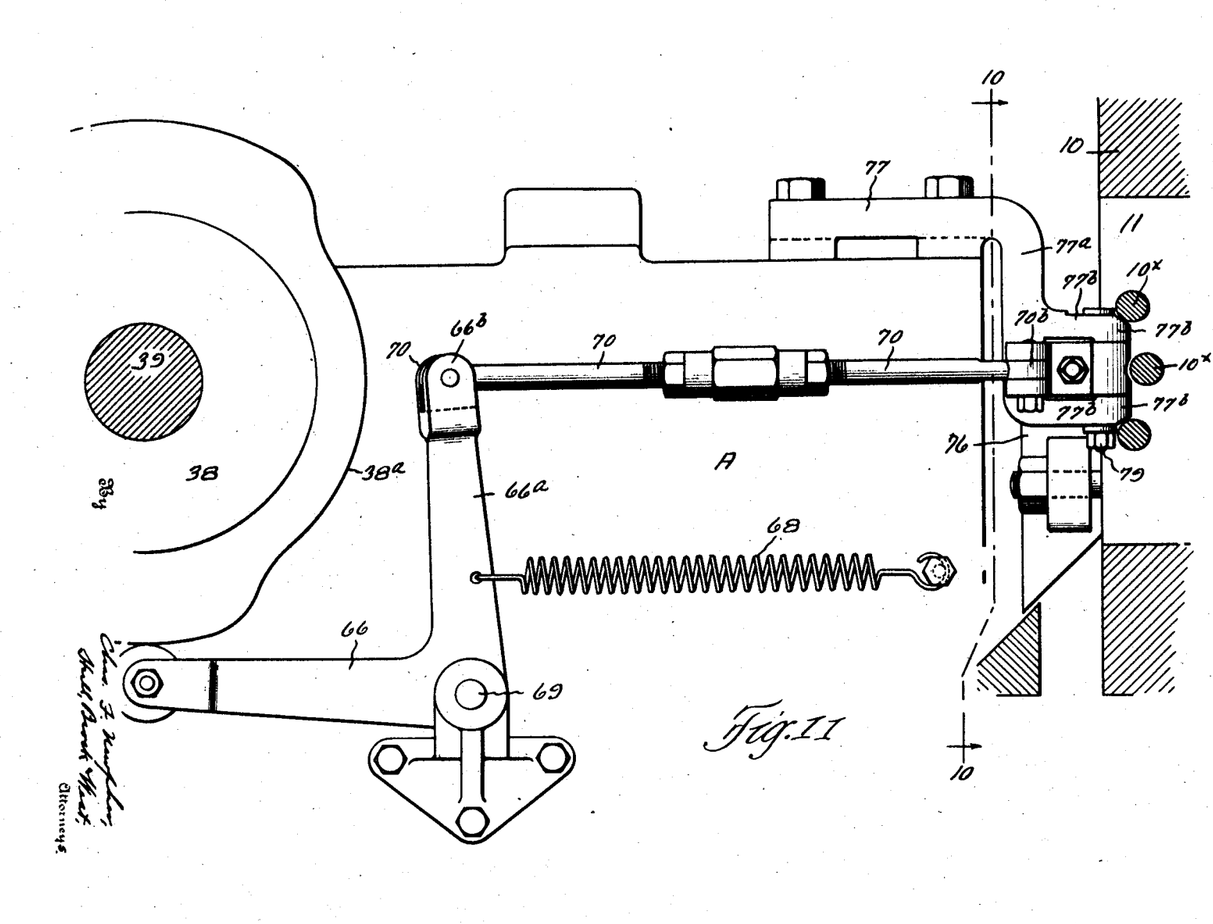
Fig. 11 a view, similar to Fig. 5 of a second modification of my invention.
Figures 13, 14:
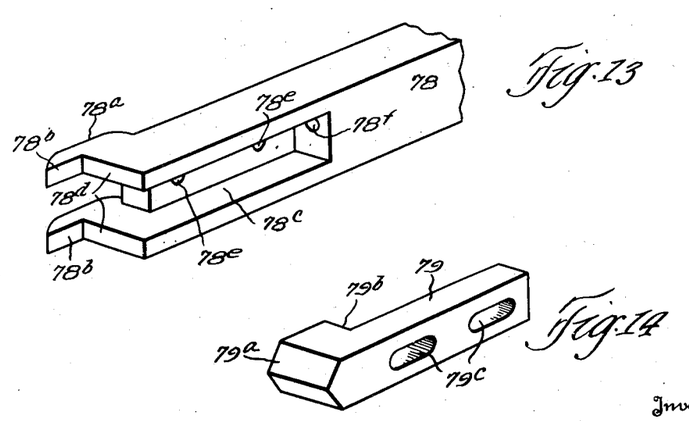

In Figs. 9 and 11, the screws 10^x for adjusting the die 11 are shown, being omitted in the preceding views.

For the purpose of operating the kicker bar 78, I employ substantially the same bellcrank lever and link that are shown in the preceding modification, designating like parts by like reference numerals. The vertical arm 66^a of the bell crank lever is connected with the longitudinally adjustable link 70, the opposite end of which is provided with an eye 70^b which is inserted between ears or lugs 78^g at the outer end of the kicker bar 78.

With the parts constructed and arranged as described in Figs. 9–14, when the roller 67 strikes the low part 38^a of the cam 38, the spring 68 rocks the arm 66^a to the right, which causes the link 70 to rock the kicker bar 78 about the pivot 78^a in such manner as to throw the fingers or projections 78^b out of the face of the die 11. These fingers, being aligned with the rear face of a slug 18, will remove said slug from the punch or from any other surface to which it may tend to adhere, and the slug will then drop down the chute 76. When the roller rides upon the high part of the cam 38, the arm 66^a is moved to the left, which will throw the kicker bar, with its stock gage, back to the position shown in Figs. 9 and 10.

In Figs. 15–18, there is shown a third modification of my invention wherein the die box, die and upper face plate are substantially the same as shown in the preceding views and designated by like reference characters. In the last form of my invention, the lower face plate 14^y is provided with a pair of inclined surfaces 82, 83 for the slugs which are dropped by moving the stock gage 84 away from the punch. It is also provided with a chute 85 for the nut blanks. The stock gage is slidably mounted in a guideway formed within a recessed standard 86 having a cover plate 87. The rear end of the stock gage is provided with an eye 84^a inserted between a pair of toggle links 88 and pivotally connected thereto by a pin 89. The opposite ends of the links 88 are pivotally connected to a toggle link 90, by means of a pin 91. The opposite end of the link 90 is pivotally connected to a block 92 which is secured to the bracket 86 by a pin 93. A screw 94 is threaded through the end of the bracket 86 and engages the block 92, thereby to take up the thrust which is delivered to the stock gage 84 by the bar of stock. 95 denotes a lever which is pivoted intermediate of its ends on one of the cross head guides 1. One end of this lever is connected by a link 96 to the joint formed between the toggle links 88 and 90, such connection being conveniently afforded by extending the pin 91. A spring 97, which is connected to the same end of the lever as the link 96, tends to move the link 96 in an appropriate direction to keep the toggle links 88 and 90 in alignment, thereby holding the stock gage 84 in operative position with reference to the bar of stock.

For the purpose of rocking the lever 95 to move the stock gage away from the punch, a cross head 3 is provided with a projection 98, which may be fastened to one of the cross bars 8, the said projection carrying a screw 99 which is adapted to engage the end of the lever 95 opposite the link 96 when the punch 7 shall have struck a nut blank from the bar and have punched the same into the die opening 11^a. The engagement of the hardened screw 99 with the lever 95 bends the toggle at the middle and draws the stock gage away from the punch, ordinarily permitting the slugs 18 to drop upon the inclines 82 and 83 and be removed thereby from the nut blanks which are directed into the chutes 85.

Having thus described my invention, what I claim is:—

1. In a machine for making nut blanks from a bar, the combination of a shearing die having an opening, a punch so shaped as to shear a nut blank from said bar and to force the same into said die, with the production of a slug in front of such blank, a stock gage in front of said die, a stripper overhanging the space between the said die and the said stock gage, a shaft for driving the said punch, and means operated by said shaft for moving the stock gage away from said punch in such manner as to release the slug therefrom.

2. In a machine for making nut blanks from a bar, the combination of a shearing die having an opening, a punch so shaped as to shear a nut blank from said bar and to produce a slug in front of said blank having a recessed front face, means for moving the said punch toward and from the said die thereby to shear said nut blank and slug from said bar and to force the blank into said opening, a stock gage in front of said die having an end adapted to substantially fit the recessed front of said slug, and means operated by the punch-moving means for moving the said gage in such manner as to remove from the punch and the parts adjacent thereto the slug sheared from the bar by said punch.

3. In a machine of the character described, the combination of a shearing die having an opening, a punch movable toward and from said opening and so shaped as to shear a nut blank from a bar and force the same into said opening, with the production of a slug, movable means engaging the said slug for positively removing it from the punch and the parts adjacent the said die, and additional means for positively engaging the said slug for removing the same in the event of the failure of the first means to effect such removal.

4. In a machine for making nut blanks from a bar, the combination of a shearing die having an opening, a punch so shaped as to shear a nut blank from such bar and force the same into said opening with the production of a slug, a stripper spaced from said die and adapted to prevent the withdrawal of the slug past said stripper by the punch, means for moving the punch toward and from the die, and means carried by said machine and operative by the punch-moving means for engaging the said slug and moving it away from the said punch, stripper, and die.

5. In a machine for making nut blanks from a bar, the combination of a shearing die having an opening, a punch so shaped as to shear a nut blank from such bar and force the same into said opening, with the production of a slug, a stripper spaced from said die and adapted to prevent the withdrawal of the slug past said stripper by the punch, means for moving the punch toward and from the opening, means carried by said machine and operated by the punch-moving means for engaging the said slug to move it away from the said punch, stripper, and die, and additional means for positively engaging the said slug for removing the same in the event of the failure of the former removing means to effect such removal.

6. In a machine for making nut blanks from a bar, the combination of a shearing die having an opening, a stock gage in front of said opening adapted to form a stop for the end of said bar, a punch, means for moving the said punch toward and from the said die thereby to shear a nut blank from the bar and force the same into said opening, with the production of a slug interposed between the punch and the stock gage, and movable means including the said stock gage for engaging the slug and moving the same away from the said punch.

7. In a machine for making nut blanks from a bar, the combination of a shearing die having an opening, a punch adapted to shear a nut blank from said bar and to force the same into said opening with the production of a slug in front of such blank, a stock gage in front of said die opening, a stripper overhanging the space between the said die and the said stock gage, a shaft for driving the said punch, and means operated by said shaft for moving the slug away from the punch and the stripper.

8. In a machine for making nut blanks from a bar, the combination of a shearing die having an opening, a kicker, a stock gage secured to said kicker in front of said opening and adapted to engage the front end of the bar, a punch, means for moving the said punch toward and from the said die thereby to shear from the front end of the bar a nut blank and a slug in front of said blank, a pivotal support for said kicker, and means for rocking the said kicker upon said support thereby to remove from the punch and the parts adjacent thereto the slug sheared from the bar by said punch.

9. In a machine for making nut blanks from a bar, the combination of a shearing die having an opening, a punch, a stock gage having an end adapted to be engaged by the front end of such bar, the said gage being located in front of the said die opening, a kicker to which the said stock gage is secured, the said kicker being pivotally supported so as to move the stock gage away from the punch and the die after the punching operation, the said kicker having a projection spaced from the end of the stock gage and adapted to engage a slug in the event that the latter is not removed by the stock gage, means for operating said punch, and means for rocking the kicker about its pivot.

10. In a machine for making angular nut blanks from a bar, the combination of a shearing die having an angular opening, a punch corresponding in contour to said opening, a stock gage having a V-shaped end adapted to be engaged by the front end of such bar, the said gage being located in front of the said opening, a kicker to which the said stock gage is secured, the said kicker being pivotally supported so as to move the stock gage away from the punch and the die after the punching operation, the said kicker having a projection spaced from the end of the stock gage and adapted to engage a slug in the event that the latter is not removed by the stock gage, a shaft for operating said punch, and connections between said shaft and said kicker for rocking the latter about its pivot.

11. In a machine for making nut blanks from a bar, the combination of a shearing die having an opening for the reception of a nut blank, a shaft, a punch, means operated by said shaft for moving said punch toward and from the die, a kicker, a pivotal support for said kicker, a stock gage carried by said kicker and having an end in front of the die opening adapted to be engaged by the front end of the said bar, a cam on said shaft, and connections between said cam and said kicker for rocking the same about its pivot when the punch shall have sheared the nut blank from the said bar thereby to remove from the punch and the parts adjacent thereto the slug formed by the punch in producing the said nut blank.

12. In a machine for making nut blanks from a bar, the combination of a shearing die having an opening for the reception of a nut blank, a punch adapted to shear a nut blank from said bar and a slug in front of said blank having a recessed front face, means for moving said punch toward and from the die, a stock gage having an end in front of the die opening and adapted to substantially fit the recessed front face of the said slug and the front end of the said bar, means for moving the said gage when the punch shall have sheared said nut blank and slug from said bar thereby to remove the slug from the punch and the parts adjacent thereto, and means movable with and additional to said gage for effecting such removal of the slug in the event of the failure of the stock gage to accomplish the same.

13. In a machine for making angular nut blanks from a hot bar, the combination of a shearing die having an angular opening therein, a kicker pivoted above the said die and having a lateral extension projecting toward and spaced from the said die opening, a stock gage having a V-shaped end in front of the said die opening, means tending to hold the said kicker with the said stock gage immediately in front of the said die opening, the said kicker having a projection overhanging the said stock gage and normally overhanging and spaced above said die opening, a shaft, an angular punch adapted to shear nut blanks of appropriate shape from the front of said bar and press the said blanks into said die opening, connections between said shaft and said punch for moving the same toward and from the said die opening, a cam on said shaft, and connections between said cam and said kicker for rocking the latter upon its pivot when the punch shall have sheared a nut blank from said bar, with the production of a slug interposed between the punch and the stock gage.

14. In a machine for making hexagonal nut blanks from a bar of stock, the combination of a die having a hexagonal opening therein, a hexagonal punch, means for moving said punch toward and from the die thereby to strike from the front end of such bar a hexagonal nut blank and a slug in front of said blank and to force the blank into said opening, a kicker pivotally supported by said machine, a stock gage on said kicker and having a V-shaped end in front of said opening and adapted to receive the notched end of the bar and of the slug sheared therefrom by said punch, a projection carried by the said kicker and extending rearwardly above the stock gage and above said opening, a spring normally holding the kicker with the stock gage in line with the opening and with said projection above the opening, a shaft, a cam on said shaft, a spring holding said kicker in contact with said cam, and means operative by the punch-operating means for operating said shaft thereby to move the kicker about its pivot to move the stock gage and the projection downwardly, thereby to remove the slug from the punch and the parts adjacent to said matrix.

15. In a machine for making nut blanks from a bar of stock, the combination of a shearing die having an opening therein, a punch, means for moving the said punch toward and from the die thereby to strike from the front end of such bar a nut blank and a slug in front of said blank and to force the blank into said opening, a kicker pivotally supported by said machine, a stock gage having an end in front of said opening and adapted to receive the end of the bar and of the slug sheared therefrom by said punch, a projection carried by the said kicker and extending rearwardly above the stock gage and above said opening, means normally holding the kicker with the stock gage in line with the opening and with the projection above the opening, a shaft, a cam on said shaft, and connections between said cam and the kicker for rocking the latter about its pivot to move the stock gage and the projection downwardly thereby to remove the slug from the punch and the parts adjacent to said die.

16. In a machine for making nut blanks from a bar, the combination of a shearing die having an opening therein, a shaft, a punch, connections between the shaft and the punch for moving the same toward and from the die thereby to shear a nut blank from the front of said bar and a slug in front of said blank and die opening, said slug having a recessed front end, a kicker pivotally supported from said machine and having an extension directed toward the die opening, a stock gage having an end adapted to receive the recessed front end of the bar and the slug sheared therefrom, the said kicker having a projection located above and overhanging the stock gage and normally spaced from the die opening and slug, an arm projecting from the pivot of said kicker, a spring connected with said arm and normally holding the kicker with the projection and stock gage in the position hereinbefore set forth, and means for rocking the said kicker about its pivot at predetermined intervals, said means comprising a cam on said shaft, a rock shaft, a cam on said rock shaft having a surface operatively engaging the said kicker, the said surface permitting the said kicker to rock about its pivot, and connections between the first mentioned cam and the rock shaft for rocking the said shaft to cause the kicker to rock when the punch shall have sheared the nut blank and slug from the front end of the bar.

In testimony whereof, I hereunto affix my signature.

CHARLES F. NEWPHER.